United States Patent [19]

Tanaka

[11] Patent Number: 4,786,701

[45] Date of Patent: Nov. 22, 1988

[54] CURABLE ORGANOSILOXANE COMPOSITION

[75] Inventor: Usamu Tanaka, Ichihara, Japan

[73] Assignee: Toray Silicone Co., Ltd., Tokyo, Japan

[21] Appl. No.: 74,661

[22] Filed: Jul. 17, 1987

[30] Foreign Application Priority Data

Jul. 23, 1986 [JP]  Japan ................................. 61-173396

[51] Int. Cl.$^4$ ........................ C08G 77/06; C08G 77/04
[52] U.S. Cl. ........................................ 528/15; 528/23; 528/31; 528/32; 528/33; 528/34
[58] Field of Search ..................... 528/32, 31, 15, 34, 528/23, 33

[56] References Cited

U.S. PATENT DOCUMENTS

| | | | |
|---|---|---|---|
| 2,639,276 | 5/1953 | Smith-Johannsen et al. | 528/15 |
| 3,527,655 | 9/1970 | Ballard | 528/32 |
| 3,699,072 | 10/1972 | Clark et al. | |
| 4,082,726 | 4/1978 | Mine et al. | |
| 4,196,273 | 4/1980 | Imai et al. | |
| 4,208,504 | 6/1980 | Hockemeyer et al. | 528/32 |
| 4,311,739 | 1/1982 | Hardman et al. | |
| 4,332,844 | 6/1982 | Hamada et al. | |
| 4,426,240 | 1/1984 | Louis et al. | 528/15 |
| 4,434,195 | 2/1984 | Skostinas | |
| 4,434,283 | 2/1984 | Sattlegger et al. | 528/33 |
| 4,701,503 | 10/1987 | Sato | 528/15 |

FOREIGN PATENT DOCUMENTS

| | | |
|---|---|---|
| 2830976 | 3/1975 | Japan . |
| 3925880 | 10/1978 | Japan . |
| 5875579 | 5/1979 | Japan . |
| 5875679 | 5/1979 | Japan . |
| 58-3682 | 2/1982 | Japan . |

*Primary Examiner*—John C. Bleutge
*Assistant Examiner*—Ralph H. Dean, Jr.
*Attorney, Agent, or Firm*—Robert Spector

[57] ABSTRACT

Organosiloxane compositions that cure by a platinum-catalyzed hydrosilation reaction include as an adhesion promoter the hydrolysis reaction product of a tetraalkoxysilane, an organopolysiloxane containing at least one lower alkenyl radical or silicon bonded hydrogen atom per molecule and, optionally, an alkoxysilane containing a carboalkyenyloxy group bonded to silicon through at least one carbon atom.

5 Claims, No Drawings

CURABLE ORGANOSILOXANE COMPOSITION

BACKGROUND OF THE INVENTION

1. Field of the Invention

The present invention relates to a curable organopolysiloxane composition. More specifically, this invention relates to a curable organopolysiloxane composition which has excellent adhesion.

2. Description of the Prior Art

A number of methods have been proposed for imparting adhesion to organopolysiloxane compositions which cure by an addition reaction between lower alkenyl radicals and silicon-bonded hydrogen atoms. The addition of either a silane containing a lower alkenyl radical and at least one silicon-bonded alkoxy group, or the addition of the partial hydrolyzate thereof is taught in U.S. Pat. No. 4,196,273, which issued to Imai et al on Apr. 1, 1980, Japanese Patent Publication No. 28,309/76, and U.S. Pat. No. 4,311,739, which issues to Hardman and Dujack on Jan. 19, 1982.

The addition of either a silane containing a silicon-bonded hydrogen atom and at least one silicon-bonded alkoxy group or a partial hydrolyzate thereof is taught in Japanese Patent Publication No. 5,836/82 which issued on Feb. 2, 1982.

The addition of a linear or cyclic polysiloxane which contains in each molecule a lower alkenyl radical or at least one silicon-bonded hydrogen atom in addition to at least one silicon-bonded alkoxy group and, optionally, groups such as the epoxy group or ester group, is taught in U.S. Pat. No. 3,699,072, which issued to Clark and Hayes on Jan. 11, 1972, U.S. Pat. No. 4,082,726, which issued to Mine and Okoyama on Apr. 4, 1978, Japanese Patent Publication No. 39,258/80; and Japanese Laid Open Patent Application (Koku) Nos. 58,756/79 and 58,755/79.

The addition of a mixture of an alkoxy-containing organosilicon compound, an organosilicon compound containing at least one silicon bonded hydrogen atom and an organotitanate is taught in U.S. Pat. No. 4,332,844, which issued to Hamada et al. on June 1, 1982.

U.S. Pat. No. 4,434,195, which issued to Skostins on Feb. 28, 1984 discloses using the combination of ethyl polysilicate and an acryloxysilane to improve the adhesion of peroxide-cured silicone rubber compositions to various substrates.

All of these prior art methods for achieving adequate adhesion to various substrates for organosiloxane compositions curable by a platinum-catalyzed hydrosilation reaction have not as yet been perfected, and problems remain in each case. In the case of the addition of silanes containing both lower alkenyl radicals and silicon-bonded alkoxy groups or partial hydrolyzates thereof, and in the case of the addition of siloxanes containing both lower alkenyl radicals and silicon-bonded alkoxy groups, the addition reaction is somewhat inhibited by the lower alkenyl groups, and the curing rate is slowed.

Siloxanes containing epoxy or ester groups are only slightly miscible with the main organopolysiloxane component, with the result that composition becomes opaque after such an addition. The trimethoxysilane disclosed in Japanese Patent Publication No. 5,836/82 is highly toxic. Furthermore, when this silane is added it generally evaporates from the organopolysiloxane composition during reduced pressure degassing.

The present inventor conducted investigations with a view to overcoming these problems in the prior art, and the present invention was developed as a result.

The objective of the present invention is to provide a curable organopolysiloxane composition which will tightly bond to various substrates without any of the disadvantages of compositions containing prior art adhesion promoters.

SUMMARY OF THE INVENTION

Organosiloxane compositions that cure by a platinum-catalyzed hydrosilation reaction include as an adhesion promoter the reaction product of a tetraalkoxysilane, an organopolysiloxane containing at least one lower alkenyl radical or silicon-bonded hydrogen atom per molecule and, optionally, an alkoxysilane containing a carboalkenyloxy group bonded to silicon through at least one carbon atom.

DETAILED DESCRIPTION OF THE INVENTION

This invention provides a an improved curable organopolysiloxane composition comprising (i) an organopolysiloxane containing at least two lower alkenyl radicals per molecule and having the average unit formula $$R^1{}_a SiO_{(4-a)/2}$$

where $R^1$ represents a monovalent hydrocarbon or halogenated hydrocarbon radical, and the average value of a is from 0.8 to 2.2, inclusive;

(ii) an organohydrogenpolysiloxane containing at least 2 silicon-bonded hydrogen atoms in each molecule and no alkenyl radicals, where the molar ratio of the total number of silicon-bonded hydrogen atoms in this component to the total number of all alkenyl radicals in components (i) and (iv) is from 0.5 to 3.0, inclusive;

(iii) a platinum-containing catalyst in an amount equivalent to from 0.1 to 100 parts by weight of platinum metal for each one million parts of combined weight of components (i) through (iv), inclusive; and (iv) from 0.5 to 20 parts by weight, based on the weight of (i), of adhesion promoter, where the improvement comprises the presence of an adhesion promoter comprising the hydrolysis reaction product of (a) 1 part by weight of a tetraalkoxysilane of the general formula , where $R^2$ represents an alkyl radical.

(b) from 0.1 to 100 parts by weight of an organopolysiloxane containing at least 1 lower alkenyl radical or silicon-bonded hydrogen atom in each molecule and having the unit formula $R^3{}_2SiO$, where each $R^3$ individually represents a hydrogen atom, a monovalent hydrocarbon radical or a monovalent halogenated hydrocarbon radical, and (c) from 0 to 10 parts by weight of an alkoxysilane with the general formula

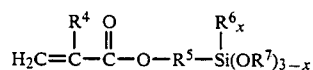

where $R^4$ represents a hydrogen atom or an alkyl radical, $R^5$ represents an alkylene radical, $R^6$ is selected from the same group as $R^1$, $R^7$ is selected from the same groups as $R^2$, and the value of x is 0 or 1.

Component (i) is the principal ingredient of the present curable organopolysiloxane compositions. This component cures and crosslinks by an addition reaction with component (ii) under the catalytic activity of component (iii). The lower alkenyl radicals present in component (i) are exemplified by vinyl, allyl, and propenyl. These lower alkenyl radicals can be present at any position in the molecule, but they are preferably present at least at the molecular terminals.

In the foregoing unit formula for component (i) the monovalent hydrocarbon radical $R^1$ is exemplified by alkyl radicals such as methyl, ethyl, propyl, and butyl; aryl radicals such as phenyl and tolyl; benzyl; halogenated alkyl radicals such as chloropropyl and 3,3,3-trifluoropropyl, and the aforementioned alkenyl radicals. The repeating units of component (i) can contain small a small concentration of hydroxyl groups. Preferably at least 70 mol % of the radicals represented by $R^1$ are methyl in order to achieve excellent adhesion, and preferably at least 90 mol % of $R^1$ is methyl in order to obtain an excellent transparency. While the average value of a is from 0.8 to 2.2, it preferably averages from 1.95 to 2.05 in order to generate excellent adhesion Although the molecular configuration of component (i) can be straight chain, branch-containing straight chain, cyclic, network, or three dimensional, a straight chain configuration, possibly slightly branched, is preferred. The molecular weight of this component is not specifically restricted, and encompasses both low viscosity fluids and very high viscosity gums. Taking into consideration the workability in mixing and the desired adhesion of the composition, the viscosity of component (i) at 25° C. is preferably in the range of 50 to 100,000 centipoise (0.05–100 Pa.s).

Examples of organopolysiloxanes suitable for use as component (i) include but are not limited to vinylpolysiloxanes, vinylsiloxane-methylsiloxane copolymers, dimethylvinylsiloxy- terminated dimethylpolysiloxanes, dimethylvinylsiloxy-terminated dimethylsiloxane-methylphenylsiloxane copolymers, dimethylvinylsiloxy-terminated dimethylsiloxane-methylvinylsiloxane copolymers, dimethylvinylsiloxy-terminated dimethylsiloxane-diphenylsiloxane-methylvinylsiloxane copolymers, trimethylsiloxyterminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers, and polysiloxanes composed of $CH_2=CH(CH_3)_2SiO_{\frac{1}{2}}$ units, $(CH_3)_3SiO_{\frac{1}{2}}$ and $SiO_{4/2}$ units.

The combination of a dimethylvinylsiloxy-terminated diorganopolysiloxane and a polysiloxane composed of $CH_2=CH(CH_3)_2SiO_{\frac{1}{2}}$ units, $(CH_3)_3SiO_{\frac{1}{2}}$ units and $SiO_{4/2}$ units can be used as component (i) in order to increase the strength of the cured material obtained from the organopolysiloxane composition of the invention.

Component (ii) is the crosslinker for component (i). Curing of the present compositions proceeds by the addition reaction of the silicon-bonded hydrogen atoms in this component with the lower alkenyl radicals in component (i) under the catalytic activity of component (iii). The silicon-bonded organic groups of component (ii) are typically monovalent hydrocarbon and halohydrocarbon radicals selected form the same group represented by $R^1$ of component (i), and preferably consist of same radicals with the exception of alkenyl radicals.

The molecular configuration of this component is not specifically restricted, and it may be straight chain, branch-containing straight chain, or cyclic. While the molecular weight of this component is similarly not specifically restricted the viscosity at 25° C is preferably from 1 to 50,000 centipoise (0.001 to 50 Pa.s), inclusive in order to obtain good miscibility with component (i).

The quantity of addition of component (ii) is defined by the condition that the molar ratio of the total quantity of silicon-bonded hydrogen atoms in this component to the total quantity of all alkenyl radicals in components (i) and (iv) is from 0.5 to 3.0, inclusive. Good curability will not be obtained when this molar ratio is less than 0.5 while a tendency to foam will appear when this molar ratio exceeds 3.0. In the event of the supplementary addition of an alkenyl-containing siloxane for the purpose of reinforcement or other reason, it is preferred that a sufficient quantity of silicon-bonded hydrogen atoms in the form of component (ii) be present compensate for the additional alkenyl radicals.

Specific examples of component (ii) include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated methylhydrogenpolysiloxanes, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{\frac{1}{2}}$ units and $SiO_{4/2}$ units, and copolymers composed of $(CH_3)_3SiO_{\frac{1}{2}}$ units, $(CH_3)_2HSiO_{\frac{1}{2}}$ units, and $SiO_{4/2}$ units.

Component (iii) is a catalyst for the addition reaction of silicon-bonded hydrogen atoms with alkenyl radicals. Specific examples of useful catalysts include chloroplatinic acid, chloroplatinic acid dissolved in an alcohol or ketone as well as such solutions which have been aged, chloroplatinic acid-olefin complexes, chloroplatinic acid-alkenylsiloxane complexes, chloroplatinic acid-diketone complexes, platinum black, and platinum supported on a carrier. Component (iii) is present at a concentration equivalent to from 0.1 to 100 parts by weight of platinum metal per one million parts (ppm) combined weight of components (i) through (iv), inclusive.

The crosslinking reaction will not proceed satisfactorily at concentrations below 0.1 ppm, while exceeding 100 ppm is not only uneconomical, but also excessively reduces the use time i.e. pot life, of the organopolysiloxane composition at room temperature. When used in an adhesive composition, a catalyst concentration of from approximately 1 to 20 ppm is generally preferred.

The characterizing feature of the present compositions is component (iv), which is responsible for very good bonding to substrates in contact with the present compositions during curing. Component (iv) is the hydrolysis reaction product of a tetraalkoxysilane [component (a)], an organopolysiloxane containing at least one lower alkenyl radical or silicon bonded hydrogen atom per molecule [component (b)] optionally the ingredient identified hereinbefore as component (c), and water.

By way of explanation, component (a) is a tetraalkoxysilane of the formula $Si(OR^2)_4$, where $R^2$ in the formula represents an alkyl radical such as methyl, ethyl or propyl. Specific examples of such tetraalkoxysilanes include but are not limited to methyl silicate and ethyl silicate. Alternatively, the partial hydrolyzate of such a tetraalkoxysilane can be used.

Component (b) is an diorganopolysiloxane having at least 1 lower alkenyl radical or at least 1 silicon-bonded hydrogen atom in each molecule. The unit formula for this component is $R^3_2SiO$, where $R^3$ represents a hydrogen atom, an alkyl radical such as methyl, ethyl or propyl; an alkenyl radical such as vinyl or allyl; aryl radicals such as phenyl and tolyl; the benzyl radical; or a halogenated alkyl radical such as chloropropyl and 3,3,3-trifluoropropyl. Specific examples of diorganosiloxane units that can be present in component (b) include but are not limited to dimethylsiloxane, methylethylsiloxane, methylphenylsiloxane, methylvinylsiloxane, methylhydrogensiloxane, diphenylsiloxane, gamma-trifluoropropylmethylsiloxane, and gamma-chloropropylmethylsiloxane.

The molecular configuration of component (b) can be either straight chain or cyclic. This component's degree of polymerization is not specifically restricted, but is preferably less than 100 from the standpoint of ease of reaction.

The concentration of component (b) will be within the range of from 0.1 to 100 parts by weight, preferably from 0.5 to 10 parts by weight per 1 part by weight of component (a). The concentration of alkenyl radicals or silicon-bonded hydrogen atoms in the reaction product is too low at below 0.1 weight part, resulting in reduced adhesion. The adhesion will likewise begin to decrease when the upper limit of 100 parts by weight of component (b) is exceeded.

Component (c) is an optional ingredient in the present compositions. This component is an acryloxy-substituted alkoxysilane of the general formula

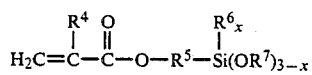

The substituent represented by $R^4$ is hydrogen or an alkyl radical including but not limited to methyl, ethyl and propyl; $R^5$ represents an alkylene radical including but not limited to propylene, butylene, and isobutylene; $R^6$ represents a monovalent hydrocarbon radical, including but not limited to alkyl radicals such as methyl, ethyl and propyl; alkenyl radicals such as vinyl and allyl; and phenyl; and $R^7$ represents a lower alkyl radical that is preferably methyl or ethyl. Examples of component (c) include but are not limited to gamma-methacryloxypropyltrimethoxysilane, gamma-acryloxypropyltrimethoxysilane, and gamma-methacryloxypropyltriethoxysilane.

The concentration of component (c) is from 0 to 10 parts by weight, preferably from 0.5 to 2 weight parts per 1 weight part of component (a). The adhesion exhibited by the present composition increases with increasing quantity of component (c) within this range. No increase in adhesion is observed at above 10 weight parts, however, there is a tendency for the miscibility of component (iii) with components (i) and (ii) to be reduced, resulting in a reduced transparency and an inhibition of curing.

Component (iv) is obtained simply by heating a mixture of components (a), (b), (c) in the presence of water and an acid catalyst. The resulting mixture is mixed and heated in order simultaneously to hydrolyze and equilibrate the three components. At least 50 mole percent of water is added, based on the total number of moles of components (a) and (c). The amount of water is preferably equal to or less than the total number of moles of alkoxy groups present in components (a) and (c). At water concentrations below 50 mole percent, based on the combination of components (a) and (c), the amount of unhydrolyzed, unreacted silane becomes too large, and the amount of low-boiling components present in component (iv) tends to become large. When the number of moles of water exceeds the total number of moles of alkoxy groups present in components (a) and (c), the major portion of the alkoxy groups are either hydrolyzed or condensed into siloxane bonds, producing a highly viscous, resinous reaction product which is difficult to use and exhibits reduced adhesion.

Acid catalysts that can be used to prepare component (iv) include the acids used as hydrolysis, condensation and equilibration catalysts for organopolysiloxanes. Examples of suitable catalysts included hydrochloric acid, trifluoroacetic acid, and trifluoromethanesulfonic acid.

Component (iv) can be prepared as a polyorganosiloxane composition by mixing components (a), (b) and (c) in advance, and dripping into this a mixture of water and the aforesaid acid catalyst, with heating and stirring, to simultaneously hydrolyze and equilibrate the three components.

Alternatively, a reaction product in the form of a polyorganosiloxane composition can be obtained by dripping the mixture of water and acid catalyst into a mixture of components (a) and (c) to yield a hydrolyzate of these two components, followed by the addition of component (b) and heating to achieve equilibration. The reaction temperature is preferably in the range of from 60° to 150° C.

A non-reactive diluent can be used to enable the hydrolysis to proceed smoothly during the early stage of the reaction. Examples of suitable diluents are the strongly polar alcohols such as methanol, ethanol and propanol, and ketones such as acetone and methyl ethyl ketone.

As the hydrolysis proceeds the alkoxy groups of the reactants undergo condensation and an alcohol is formed as a by-product. For the equilibration reaction to proceed, the reaction mixture is heated either in the presence of the alcohol, or the alcohol is first removed by distillation from the reaction system, at which time the reaction mixture is heated at the prescribed temperature.

When component (b) is a organohydrogenpolysiloxane, it is generally preferred that the by-product alcohol be removed from the reaction mixture before component (b) is added and the reaction mixture is heated to develop the equilibration reaction.

The hydrolysis/equilibration reaction product is neutralized using a base. The type of base is not specifically restricted, however, an alkali metal, alkaline earth metal or ammonium carbonate or bicarbonate is preferred in order to neutralize the reaction mixture under mild conditions. Examples of such neutralizing agents are sodium carbonate, sodium bicarbonate, potassium carbonate, calcium carbonate, calcium bicarbonate, potassium bicarbonate, and ammonium carbonate.

Following neutralization component (iv) is purified by filtration after removing low-boiling components present in the reaction product under reduced pressure.

Component (iv) is used within the range of from 0.5 to 20 parts by weight, preferably from 1 to 10 parts by weight per 100 parts by weight of component (i). The cured material will not tightly bond to the substrate at concentrations below 0.5 weight parts, while the mechanical strength of the cured product is reduced when the concentration exceeds 20 parts by weight.

The curable organopolysiloxane composition of the invention is produced simply by mixing components (i) through (iv) in any mixing device suitable for the agitation of a gum or fluid, for example, planetary mixers, screw-type mixers, static mixers, and kneader mixers.

It is recommended that a small or very small amount of an additive which inhibits the curing reaction at room temperature, for example, an acetylenic compound, a hydrazine, a triazole, a phosphine, or a mercaptan be added to the curable organopolysiloxane composition of the invention. Other optional ingredients include but are not limited to fillers such as finely divided silica, and carbon black, heat stabilizers, colorants, and flame retardants. The concentration of thee optional additives should not adversely affect the objectives of the invention.

The following examples describe preferred embodiments of the present compositions, and should not be interpreted as limiting the scope of the accompanying claims. Unless otherwise specified all parts and percentages in the examples are by weight, viscosities and other properties are measured at 25° C. and the symbol "Me" represents the methyl radical.

EXAMPLE 1

An adhesion promoter of this invention was prepared by placing fifty g of tetramethoxysilane, 50 g cyclic methylvinylpolysiloxane, 15 g cyclic dimethylpolysiloxane, 10 g methanol, and 0.5 g concentrated sulfuric acid in a three-neck 300 cc-capacity flask equipped with a mechanically driven stirrer and a condenser. The contents of the flask were mixed and heated at the boiling point of the reaction mixture while 3.0 g of ion-exchanged water were continuously dripped in. The resultant mixture was heated at the boiling point with stirring for 2 hours, then neutralized by the addition of 1 g sodium carbonate, and finally heated under reduced pressure (90° C. and 30 mm Hg) to remove the low-boiling fraction. Filtration of the reaction product yielded 70 g of a transparent reaction product having a viscosity of 15 centipoise (0.015 Pa.s).

100 Parts of a dimethylvinylsiloxy-terminated dimethylpolysiloxane having a viscosity of 10,000 centipoise (10 Pa.s), 3 parts of a trimethylsiloxy-terminated dimethylsiloxane-methylhydrogensiloxane copolymer having a viscosity of 10 centipoise (0.010 Pa.s), referred to hereinafter as polymer X1, and 0.1 part of a 1% solution of chloroplatinic acid in 2-ethylhexanol were mixed with 2 parts of the reaction product described in the first paragraph of this example. The resultant mixture was applied to a glass plate and cured at 150° C. for 30 minutes, at which time the adhesion and optical transmittance of the cured product were measured. The degree of cohesive failure was 80% and the optical transmittance was 90%. The degree of cohesive failure was measured by peeling the cured material from the glass plate and inspecting the peeled surface of the cured organosiloxane composition. The degree of cohesive failure is equal to the percentage of this surface area in which rupture occurred within the cured material. The optical transmittance is the percent transmittance measured using a 10 mm-thick sample of cured organopolysiloxane and a wavelength of 500 nanometers.

EXAMPLE 2

Twenty-three g of tetramethoxysilane, 15 g of a mixture of methylvinylpolysiloxane cyclics, 50 g of a dimethylpolysiloxane oil having a viscosity of 100 centistokes ($10^{-4}$ m$^2$/sec), available as SH200 oil from Toray Silicone Co., Ltd., 20 g gamma-methacryloxypropyltrimethoxysilane, and 10 g methanol were mixed and then hydrolyzed and equilibrated as described in Example 1 to obtain 80 g of a reaction product. A composition was obtained by mixing this with the curable composition described in Example 1. After curing as described in Example 1, the degree of cohesive failure on glass was 100% and the optical transmittance was 70%.

EXAMPLE 3

Ten g of methanol were added to and mixed with 15 g of tetramethoxysilane, 15 g of a mixture of cyclic methylvinylsiloxanes, 50 g of a mixture of cyclic dimethylsiloxanes, 5 g of a mixture of cyclic methylphenylsiloxanes, and 20 g gamma-methacryloxypropyltrimethoxysilane. The resultant mixture was stirred and heated to the boiling point, at which time a solution of 0.04 g trifluoromethanesulfonic acid dissolved in 1.7 g water was added dropwise, followed by stirring with heating at the boiling point for 2 hours.

The resultant liquid was then neutralized by adding 0.5 g calcium carbonate and stirring, followed by heating under reduced pressure (90° C. and 30 mm Hg) to remove the low-boiling fraction. Filtration of the resultant reaction product yielded 90 g of a transparent liquid having a viscosity of 13 centipoise (0.013 Pa.s).

A curable organopolysiloxane composition of this invention was prepared by adding and blending 3 parts of this reaction product into (i) 100 parts of a dimethylvinylsiloxy-terminated dimethylpolysiloxane referred to hereinafter as A2 and having a viscosity of 2,000 centipoise (2 Pa.s), (ii) 10 parts of an organopolysiloxane resin, 4 parts trimethylsiloxy-terminated dimethylsiloxane-methylhydrogensiloxane copolymer, and (iii) 0.1 part catalyst (platinum content=0.1%) consisting of a complex of chloroplatinic acid and divinyltetramethyldisiloxane that had been diluted with a siloxane polymer to the desired platinum content. The organopolysiloxane resin was composed of Me$_2$ViSiO$_{\frac{1}{2}}$, Me$_3$SiO$_{\frac{1}{2}}$ and SiO$_2$ units, contained 2% of vinyl radicals and exhibited a softening point of 120° C. This composition was cured, following which the degree of cohesive failure and optical transmittance were measured as described in the preceding Example 1. The degree of cohesive failure was 100%, and the transmittance was 90%.

EXAMPLE 4

An embodiment of component (iv) of this invention was prepared blending 30 g of tetramethoxysilane, 15 g of a mixture of cyclic methylvinylsiloxanes, 50 g of a mixture of cyclic dimethylsiloxanes, 5 g gamma-methacryloxypropyltrimethoxysilane, and 10 g of methanol. The resultant mixture was hydrolyzed and equilibrated as described in Example 3 to yield 85 g of a transparent reaction product having a viscosity of 15 centipoise (0.015 Pa.s). A curable organopolysiloxane composition was obtained by blending this embodiment of component (iv) into the other ingredients (i–iii) of the curable organosiloxane composition described in Example 3. This composition was cured as described in Example 3, and the degree of cohesive failure and transmittance were measured: the adhesiveness was 100%, and the transmittance was 97%.

EXAMPLE 5

An embodiment of component (iv) was prepared by combining thirty g tetramethoxysilane, 50 g of a mixture of cyclic dimethylsiloxanes, 5 g of gamma-methacryloxypropyltrimethoxysilane, 10 g of methanol, and 0.04 g trifluoromethanesulfonic acid. The resultant mixture was stirred and heated at the boiling point while being hydrolyzed by the dropwise addition of 2 g water. The reaction product was allowed to stand for 1 hour, at which time the low-boiling substances were distilled under reduced pressure, and the reaction product was then heated to 100° C. Five g of a trimethylsiloxy-terminated methylhydrogenpolysiloxane having a viscosity of 30 centipoise was then added, followed by heating with stirring for two hours, at which time the reaction product was worked up as described in the preceding Example 3 to yield 70 g of a product having a viscosity of 15 centipoise (0.015 Pa.s).

A curable composition of this invention was prepared by adding 4 parts of this reaction product to a mixture of 100 parts polymer A2 as described in Example 3, 4 parts polymer X1 as described in Example 1, 0.4 parts tetramethyltetravinylcyclotetrasiloxane and an amount of divinyltetramethyldisiloxane-chloroplatinic acid complex in an amount sufficient to give 10 ppm platinum based on the total weight of the composition.

The degree of cohesive failure and transparency were determined as described in Example 1. The sample exhibited 100% cohesive failure and a transmittance value of 98%.

COMPARISON EXAMPLE 1

A composition was produced as described in Example 5, but with the omission of the embodiment of component (iv) described in Example 5. After curing as described in Example 5, the degree of cohesive failure was 0%, although the transmittance was 98%.

The curable organopolysiloxane compositions of this invention are particularly suitable as adhesives and coatings for a variety of different substrates, such as glasses, ceramics, metals, resins, papers, and fibers. The present compositions find application in diverse industries such as the electric/electronic industry, instrumentation industry, automobile industry, machine industry, civil engineering and construction industries, container and packaging industries, and the medical appliance industry.

The excellent transparency of the compositions make them particularly suitable as an adhesives for optical applications.

That which is claimed is:

1. In an improved curable organopolysiloxane composition comprising
   (i) an organopolysiloxane containing at least two lower alkenyl radicals per molecule and having the average unit formula $R^1_a SiO_{(4-a)/2}$ where $R^1$ represents a monovalent hydrocarbon or halogenated hydrocarbon radical and the average value of a is from 0.8 to 2.2, inclusive;
   (ii) an organohydrogenpolysiloxane containing at least 2 silicon-bonded hydrogen atoms in each molecule and no alkenyl radicals, where the molar ratio of the total number of silicon-bonded hydrogen atoms in this component to the total number of all alkenyl groups in components (i) and (iv) is from 0.5 to 3.0, inclusive;
   (iii) a platinum-containing catalyst in an amount equivalent to from 0.1 to 100 parts by weight of platinum metal for each one million parts of combined weight of components (i), (ii) and (iv); and
   (iv) from 0.5 to 20 parts by weight per 100 weight parts of component (i), of an adhesion promoter, the improvement wherein ingredient (iv) is the hydrolysis reaction product of
   (a) 1 part by weight of a tetraalkoxysilane of the general formula $Si(OR^2)_4$, where $R^2$ represents an alkyl radical,
   (b) from 0.1 to 100 parts by weight of an organopolysiloxane containing at least 1 lower alkenyl radical or silicon-bonded hydrogen atom in each molecule and having the unit formula $R^3_2SiO$, where each $R^3$ individually represents a hydrogen atom, a monovalent hydrocarbon radical or a monovalent halogenated hydrocarbon radical, and
   (c) from 0 to 10 parts by weight of an alkoxysilane of the general formula $$H_2C=CCOR^5Si^x(OR^7)_{3-x}$$
   with $R^4$ over C and $R^6$ over Si where $R^4$ represents a hydrogen atom or an alkyl radical, $R^5$ represents an alkylene radical, $R^6$ is selected from the same group as $R^1$, $R^7$ is selected from the same group as $R^2$, the value of x is 0 or 1, and said hydrolysis reaction product is prepared in the presence of water and an acid catalyst.

2. A composition according to claim 1 where component (a) is ethyl orthosilicate or methyl orthosilicate, at least 70 mole percent of the hydrocarbon radicals represented by $R^1$ are methyl, the hydrocarbon radicals present in said organohydrogenpolysiloxane are selected from the same group as $R^1$, $R^2$ and $R^7$ are methyl or ethyl, $R^3$ represents hydrogen, alkyl, alkenyl, aryl, benzyl or halogenated alkyl, $R^4$ is hydrogen or methyl, $R^5$ is propylene, and $R^6$ is selected form the same group as $R^1$.

3. A composition according to claim 2 where $R^1$ and the silicon bonded hydrocarbon radicals present in said organohydrogensiloxane are methyl, the viscosity of (i) is from 50 to 100,000 cps (0.02 to 100 Pa.s), the viscosity of (ii) is from 1 to 50,000 cps (0.001 to 50 Pa.s), the concentration of (iii) is equivalent to from 1 to 20 parts by weight of platinum per million parts of the combined weight of (i) to (iv), inclusive, component (iii) is a derivative of chloroplatinic acid, and the concentration of (iv) is from 1 to 10 parts by weight per 100 parts by weight of (i).

4. A composition according to claim 3 where the concentration of (b) is from 0.5 to 10 parts by weight per part by weight of (a), and the concentration of (c) is from 0.5 to 2 parts by weight per part by weight of (a).

5. A composition according to claim 1 where the number of moles of water used to prepare ingredient (iv) is from 0.5 mole per total moles of ingredients (a) and (c) up to the total number of moles of alkoxy groups present in ingredients (a) and (c), and the resultant reaction product is neutralized using a base.

* * * * *

UNITED STATES PATENT AND TRADEMARK OFFICE
CERTIFICATE OF CORRECTION

PATENT NO. : 4,786,701

DATED : November 22, 1988

INVENTOR(S) : Osamu Tanaka

It is certified that error appears in the above-identified patent and that said Letters Patent is hereby corrected as shown below:

On the title page, item [75] should read:

--(75) Inventor: Osamu Tanaka --.

Signed and Sealed this

Fifth Day of December, 1989

*Attest:*

JEFFREY M. SAMUELS

*Attesting Officer*     *Acting Commissioner of Patents and Trademarks*